United States Patent

Lohner et al.

[11] Patent Number: 5,904,890
[45] Date of Patent: May 18, 1999

[54] APPARATUS AND METHOD FOR PRODUCING THREE-DIMENSIONAL OBJECTS

[75] Inventors: Andreas Lohner, Haar; Christian Wilkening, Diessen-Ammersee, both of Germany

[73] Assignee: EOS GmbH Electro Optical Systems, Planegg, Germany

[21] Appl. No.: 08/945,486

[22] PCT Filed: Feb. 19, 1997

[86] PCT No.: PCT/EP97/00787

§ 371 Date: Oct. 20, 1997

§ 102(e) Date: Oct. 20, 1997

[87] PCT Pub. No.: WO97/30836

PCT Pub. Date: Aug. 28, 1997

[30]  Foreign Application Priority Data

Feb. 20, 1996 [DE] Germany ............................ 19606128

[51] Int. Cl.[6] ............................ B29C 35/08; B29C 41/02
[52] U.S. Cl. .................... 264/401; 264/40.1; 264/308; 264/497; 364/468.26; 364/468.27; 425/135; 425/174.4
[58] Field of Search ..................... 264/40.1, 308, 264/401, 497; 364/468.26, 468.27; 425/135, 174.4

[56]  References Cited

U.S. PATENT DOCUMENTS

| 4,863,538 | 9/1989 | Deckard | 156/62.2 |
| 5,014,207 | 5/1991 | Lawton | 364/468.27 |
| 5,130,064 | 7/1992 | Smalley et al. | 264/401 |
| 5,352,405 | 10/1994 | Beaman et al. | 419/45 |

FOREIGN PATENT DOCUMENTS

| 393 677 A2 | 10/1990 | European Pat. Off. |
| 590 956 A1 | 4/1994 | European Pat. Off. |
| 609 772 A1 | 8/1994 | European Pat. Off. |
| 43 09 524 C1 | 11/1993 | Germany . |
| 44 12 160 A1 | 10/1994 | Germany . |
| 44 16 901 A1 | 11/1995 | Germany . |
| WO 92/08567 | 5/1992 | WIPO . |

Primary Examiner—Leo B. Tentoni
Attorney, Agent, or Firm—George W. Neuner

[57]  ABSTRACT

In order to achieve a homogeneous density distribution in a layer to be solidified of a three-dimensional object produced by laser sintering a laser beam is passed across the surface of the layer to be solidified, whereby the travelling speed of the beam varies as a function of the length of lines of a line pattern.

12 Claims, 3 Drawing Sheets

APPARATUS AND METHOD FOR PRODUCING THREE-DIMENSIONAL OBJECTS

FIELD OF THE INVENTION

The present invention relates to a method and an apparatus for producing a three-dimensional object by successive solidification of individual layers of a solidifiable material at places according to the cross-section of the object effected by a beam of electromagnetic radiation, and methods therefor.

BACKGROUND OF THE INVENTION

When producing a three-dimensional object by rapid prototyping a solidifiable substance is applied layerwise onto a support or onto a previous layer, respectively, and solidified for each layer using radiation, for example a focused light beam, at those places of the layer which correspond to the cross-section of the object. If the applied material is a powder and solidified using laser beams, the method is called laser sintering. Such a method is for example known from U.S. Pat. No. 4,863,538. If a liquid photocurable material is used, the method is called stereolithography. Such a method is for example known from U.S. Pat. No. 5,014,207.

The applicant is aware that for the laser sintering the laser beam may be passed over the layer to be solidified according to a line pattern, for example in meanders as shown in FIG. 1.

FIG. 1 shows a top view of a layer to be solidified 1 of a three-dimensional object to be formed in a coordinate system having a x-direction and a y-direction. In this method a line pattern 2 is determined which depends on the geometry of the layer. The line pattern 2 comprises parallel lines spaced from each other by a distance d. For solidifying the layer I the laser beam is passed with a constant speed v across the surface of the layer 1 to be solidified along the line pattern 2 in the direction indicated by the arrow. Owing to the irregular cross-section of the object in this layer the lines have different lengths L.

FIG. 2 shows the density of the layer to be solidified as a function of the layer geometry, i.e. indirectly as a function of the length of the lines passed by the laser beam. It turns out that the density of the layer to be solidified decreases with increasing length of the lines. In summary, this method produces an inhomogeneous density distribution in the layer to be solidified if the line pattern which is followed by the beam for solidifying the layer comprises lines having different lengths and if the beam passes over the layer with a constant speed.

The occurance of the inhomogeneous density distribution as a function of the line length of the line pattern 2, as shown in FIG. 2, can be explained as follows: Generally, rally, the spacing d of the lines of the line pattern is twice or four times smaller than the diameter of the laser beam cross-section on the surface of the layer 1 to be solidified. Thus, a section on a line can be scanned up to five times if the cross-section of the beam is passed along adjacent lines. With a smaller line length a portion of this line is therefore scanned in rapid succession. It is therefore possible to keep this section nearly continuously on a temperature which is higher than or equal to the sintering temperature. Losses by heat conduction are compensated by the rapid timely sequence of the scans. Thus, the input of energy which directly contributes to the sintering process is high in this section and the material to be sintered has a high portion of liquid phase. A high density is produced during the solidification in such a section.

However, if the beam is passed along a long line, a section along this line cools down to ist original temperature owing to heat conduction losses after the passage of the beam cross section over this section. When again scanning this section it must again be heated up to the sintering temperature. Thus, losses due to heat conduction and reheating cannot be compensated in such a section and a solidification occurs with a density which is smaller than the density of the substance in the section having the smaller line length.

Such an inhomogeneous density distribution within the layer to be solidified and therefore within a three-dimensional object to be formed causes, during the scanning operation, internal mechanical stress producing a deformation of the three-dimensional object to be formed and therefore a loss in its manufacturing precision.

It is the object of the present invention to provide a method and an apparatus for producing a three-dimensional object using rapid prototyping, whereby a homogeneous density distribution is guaranteed in a three-dimensional object to be formed even if the object is produced in layers having arbitrary cross-sectional geometries and if the scanning is made using line patterns comprising lines of different lengths.

SUMMARY OF THE INVENTION

The present invention provides a method for producing a three-dimensional object by successively providing layers of a material and scanning said layers with a beam of electromagnetic radiation at places corresponding to the cross-section of said object to solidify said layers thereat. The method comprises the following steps for each layer for producing said object: providing a layer of said material; scanning said layer with said beam along a plurality of parallel adjacent lines with a travelling speed of said beam, said lines having different lengths; and adjusting said travelling speed of said beam along each of said adjacent lines as a function of said length of said line.

The invention also provides an apparatus for producing a three-dimensional object by scanning successive layers of a material with a beam of electromagnetic radiation along a plurality of parallel adjacent lines having different lengths to solidify the material at places corresponding to the cross-section of the object, a travelling speed of the beam along each of said adjacent lines being adjusted as a function of the length of the line. The apparatus comprises support means for supporting said object to be formed, coating means for applying layers of said material onto said support means or onto a previously solidified layer, beam generating means for generating a beam of electromagnetic radiation, beam directing means for directing said beam of electromagnetic radiation onto a surface of said layer for scanning said layer with a travelling speed of said beam along a plurality of adjacent lines, and control means for controlling said travelling speed of said beam as a function of the length of the line being scanned.

The inventive method allows to obtain, in a very easy manner, a homogeneous density distribution in a three-dimensional object having any shape whatsoever.

According to a preferred embodiment of the method the speed v used for passing the beam along the lines of the line pattern 2 decreases with increasing length of the lines. This guarantees that losses resulting from the fact that the heat flows off and reheating is therefore required are compensated and the generation of a homogeneous density distribution can therefore be guarateed.

Further features and advantages of the invention will be apparent from the following description of embodiments with reference to the figures.

DETAILED DESCRIPTION OF THE INVENTION AND PREFERRED EMBODIMENTS

Figure 3:
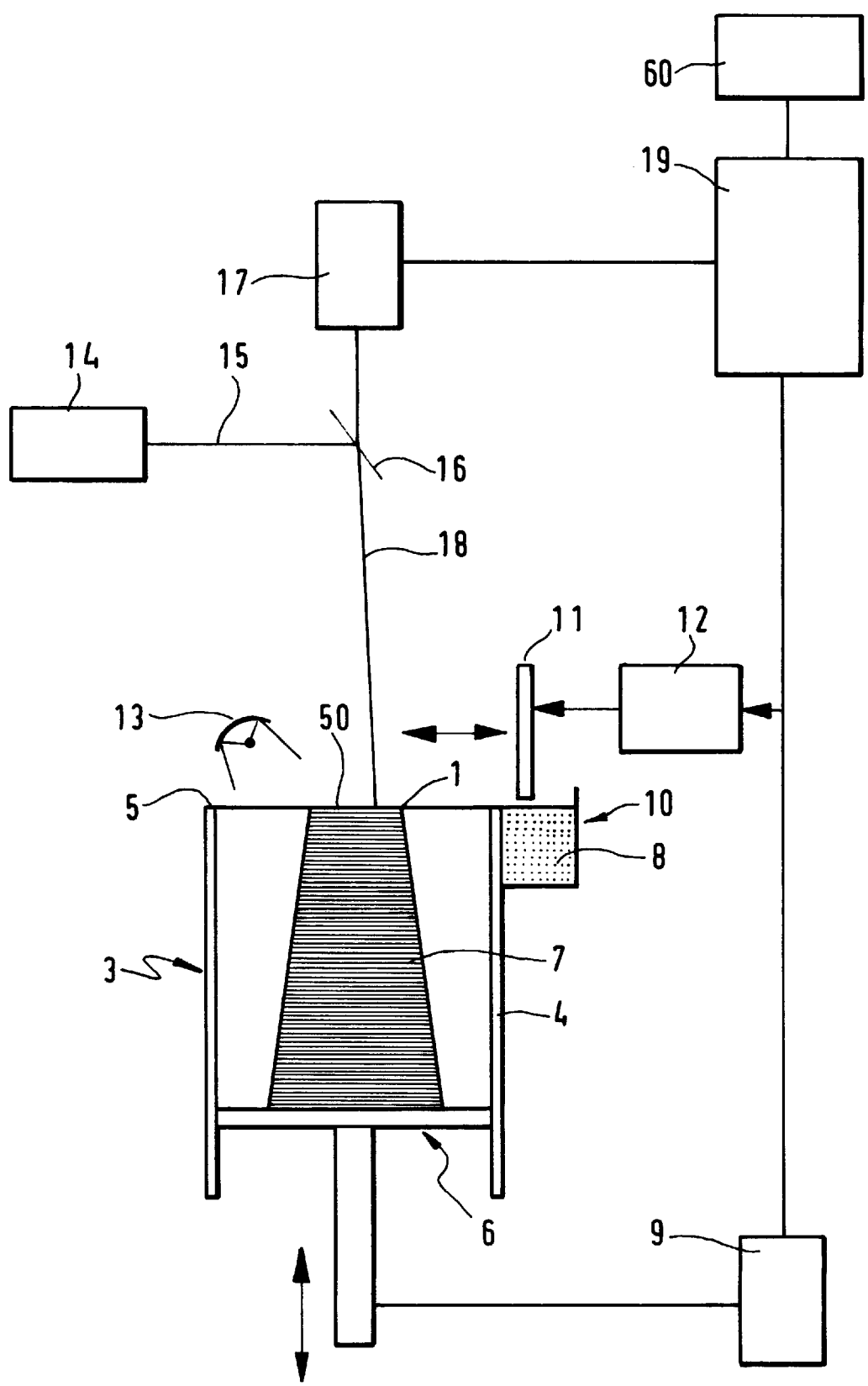
FIG. 3 is a schematic side view of the construction of an apparatus for producing a three-dimensional object using laser sintering.

As shown in FIG. 3 the apparatus comprises a container 3 which is formed by a peripherally closed side wall 4 only. The upper edge 5 of the side wall 4 or of the container 3, respectively, defines a working plane 50. A support 6 for supporting an object 7 to be formed is arranged within the container 3. The object 7 is disposed on the upper side of the support 6 and formed of a plurality of layers extending parallel to the upper side of the support 6. These layers are formed of a powdery construction material 8 which is solidified using electromagnetic radiation in a manner described further below. The support 6 can be displaced in vertical direction, i.e. parallel to the side wall 4 of the container 3, by means of an elevational adjustment device 9. This adjusts the position of the support 6 in relation to the working plane 50.

A store tank 10 for the construction material 8 is provided laterally at the container 3. The store tank 10 has an open top and is permanently filled with the powdery construction material 8 up to a level which is slightly above the upper edge 5 adjacent to the container 3. To this end a piston or a displaceable bottom, not shown in FIG. 3 and similar to the support 6, is provided which can be displaced in vertical direction within the store tank 10.

Especially metal powder, ceramic powder or resin powder is used for the powdery construction material 8. Further, resin coated metal or ceramic powder or molding sand, consisting of quartz sand having a coating of resin, may be used.

Above the container 3 or the working plane 50, respectively, there is a coating device 11 having a lower edge disposed in the working plane 50. The coating device 11 serves for applying the construction material onto the upper side of the support 6 or onto a previously formed layer of the object 7 to be formed, respectively. The coating device 11 can be displaced transversely across the container 3 in a direction parallel to the upper edge 5 of the container 3 from a first position above the store tank 10 to a second position opposite to the store tank and back by means of a displacement device 12.

A heating apparatus 13 which is schematically indicated in FIG. 3 is provided above the container 3 or the working plane 50, respectively. The heating apparatus 13 serves for heating the powder layer applied by the coating device 11 to a preliminay temperature required for sintering using the laser beam.

Above the container 3 or the working plane 50, respectively, there is further provided a device 14 for solidifying the respective uppermost layer 1 of the object 7 adjacent to the working plane 50. The device 14 comprises a light source in the form of a laser which produces a focused light beam 15. About centrally above the container 3 there is a deviation mirror 16 which is suspended on gimbals and which can be swung by a schematically indicated swivel device 17 so that the light beam 15 directed onto the mirror 16 can be positioned, as reflected light beam 18, at substantially any place of the working plane 50.

The elevational adjustment device 9, the displacement device 12 and the swivel device 17 are connected with a common control device 19 for central and coordinated control of these devices. The control device 19 is connected to a computer 60. The control 19 is adapted to control the swivel device 17 for the deviation mirror 16 corresponding to a predetermined line pattern 2 for deflecting the laser beam with predetermined speeds v.

For producing a three-dimensional object data defining the shape of the object 7 are first generated in the computer coupled to the control device 19 using a design program. These data are processed for producing the object 7 in such a manner that the object is decomposed into a plurality of horizontal layers which are thin in relation to the object dimension and have a thickness of for example 0.1–1.0 mm, and the form data for this layer are provided.

Thereafter the following steps are carried out for each layer.

Using the elevational adjustment device 9 the support 6 is positioned within the container 3 so that, in case of the first layer, its upper side or, in case that solidified layers do already exist, the upper side of the last solidified layer is below the edge 5 of the container 3 by a predetermined layer thickness h. Thereafter a layer of the material 8 is applied from the store tank 10 onto the upper side of the support 6 or onto the previously formed layer, respectively, using the coating device 11. This freshly applied powder is cold powder from the store tank 10 which is brought to a predetermined preliminary sintering temperature using the heating apparatus 13. After the entire freshly applied powder layer has reached the temperature required for sintering the swivel device 17 is controlled corresponding to the form data for the layer in such a manner that the deflected light beam 18 strikes the layer at the places corresponding to the cross-section of the object 6 and solidifies or sinters the construction material 8 thereat. This is explained in more detail in the following.

When processing the geometrical data of the respective thin layers to be produced of the three-dimensional object 7 to be formed the control device 19 determines a pattern 2 of lines defining paths along which the point of intersection of the laser beam 18 and the surface of the layer 1 to be solidified within the working plane 50 shall pass. The line pattern 2 consists of mutually parallel lines having a spacing d which have their ends connected so as to form a meandering pattern. The lines are designated as fill lines. The line pattern 2 fills the area of the layer to be solidified. The various lengths L of the lines of the line pattern 2 along which the laser beam 18 shall be directed are determined in the control device 19 or in the computer 50 coupled thereto. The analysis of the line length as a function of the layer geometry in X-direction is shown in FIG. 4a.

Thereafter a speed v for directing the laser beam 18 across the layer 1 to be solidified in the working plane 50 along a corresponding line is determined for each line of the line pattern 2. The beam speeds v are assigned to the line length L such that an homogeneous density distribution is produced within the entire layer 1 to be solidified.

The exact determination of the speed v required for obtaining a homogeneous density as a function of the line length L is made using a lookup table which is experimentally set up. The correspondence of speed v and line length L is experimentally determined by producing a plurality of a parallepiped test bodies having the same width and height but different length by laser sintering. The speed of the laser beam for scanning each test body is selected so that the test bodies all have the same desired density. Thus a correlation of the length of a test body to the required speed is given. Values between the points of the lockup tables are interpolated.

Figure 1:
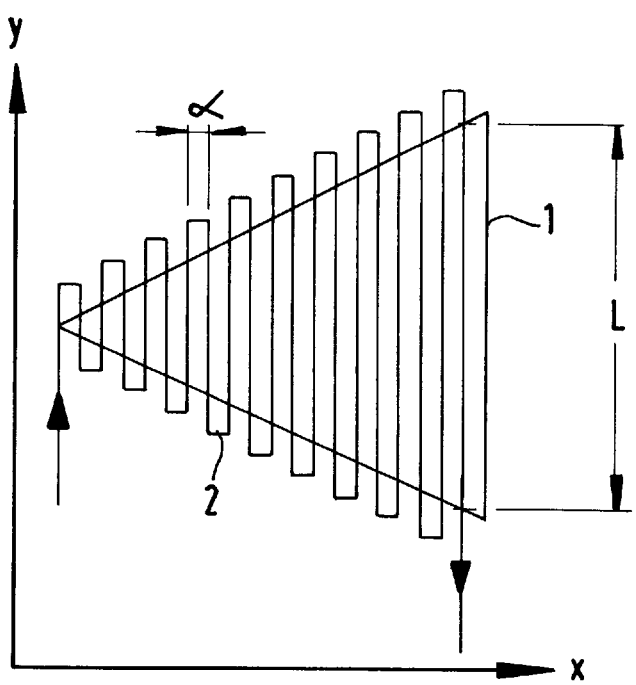
FIG. 1 is a schematic top view of a layer to be solidified and of a line pattern used for scanning.
Figure 2:
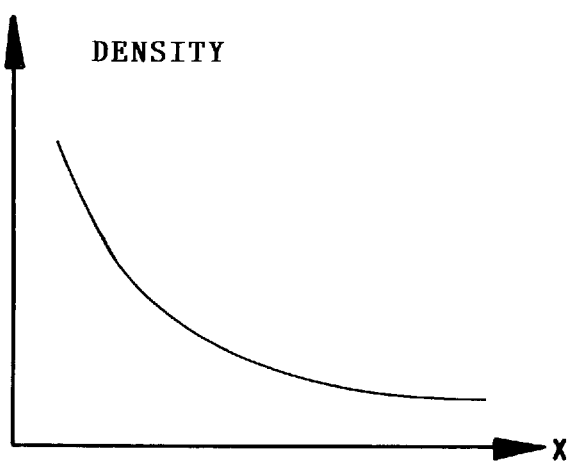
FIG. 2 is a graph explaining the interrelationship between the layer geometry and the density distribution.
Figure 4:
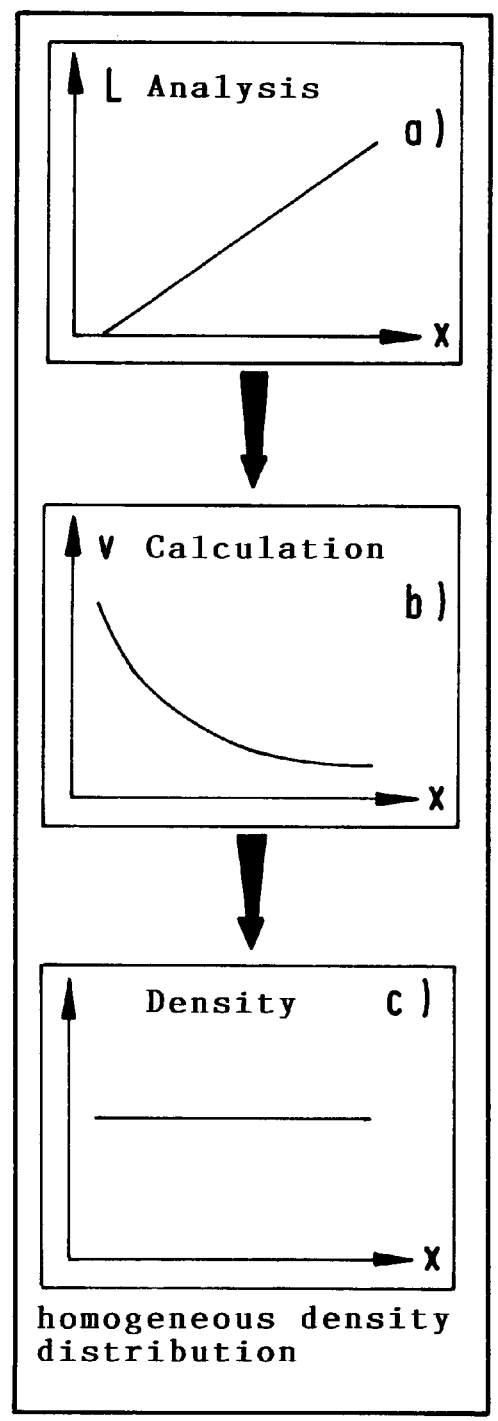
FIG. 4a–4c are graphs explaining the line length L, the beam speed v and the density distribution as a function of the layer geometry x.

The distribution of the beam speed required for achieving a homogeneous density for the line pattern 2 represented in FIG. 1 is shown in FIG. 4b. FIG. 4c shows the resulting homogeneous density distribution.

In the above-described method a short line is assigned a higher speed than a long line.

The fact that the beam speed v is approximately inversely proportional to the line length L ensures that the energy input by the laser beam suitable for achieving a homogeneous density distribution is given at each place of the layer region to be solidified.

In the following an alternative method for achieving a homogeneous density distribution will be described. Reference is again made to the line pattern 2 used in processing the data about the shape of the layer 1 to be solidified, as shown in FIG. 1. The layer 1 is scanned with a respective constant speed v of the laser beam in two successive steps. In a first step the scanning is made along the line pattern 2 having a line spacing $d_1$, which is greater than the cross-sectional diameter of the laser beam. In a second step the same layer is again scanned along a second line pattern 2' having the same line spacing $d_1$, whereby the second pattern 2' is offset from the first line pattern 2 by $d_1/2$.

Alternatively, the layer may be scanned with in total N steps whereby the nth line pattern n=2, . . . N of the nth step is offset from the previous line pattern by the distance $d_1/N$, respectively.

According to this method, sections on adjacent lines are not passed in a rapid timely sequence, even if the length of the lines in this region is short because adjacent lines having a distance from each other which is smaller than the cross-sectional diameter of the laser beam are scanned in the next step only. Thus, the heat conduction loss is constant for all regions of the layer 1 to be solidified.

The invention is not limited to the meandering scanning line pattern 2 shown in FIG. 1. For example, a contour scan of the layer to be solidified may first be made and the contour may thereafter be filled with parallel hatch lines.

Furthermore, the invention is not limited to laser sintering but may also be used in stereolithography.

It is the particular advantage of the present invention that it guarantees that equal fractions of liquid phase are produced in the material to be sintered in each portion of the layer to be solidified.

We claim:

1. A method for producing a three-dimensional object by successively providing layers of a material and scanning said layers with a beam of electromagnetic radiation at places corresponding to the cross-section of said object to solidify said layers thereat, said method comprising the following steps for each layer for producing said object:

providing a layer of said material;

scanning said layer with said beam along a plurality of parallel adjacent lines with a travelling speed of said beam, said lines having different lengths; and adjusting said travelling speed of said beam along each of said adjacent lines as a function of said length of said line.

2. The method of claim 1, comprising adjusting said travelling speed of said beam so as to decrease with increasing length of said line.

3. The method of claim 1, comprising scanning said layer along mutually parallel lines, which are spaced from each other.

4. The method of claim 3, comprising scanning said layer by interconnecting said lines each at an end thereof, so as to form a meandering line pattern.

5. The method of claim 1, comprising adjusting said travelling speed for each line to achieve a homogeneous density of said layer after solidification thereof.

6. The method of claim 5, comprising experimentally determining said adjusted travelling speed for each length of a line by solidifying a plurality of parallel piped test bodies having the same height and width but different lengths using different travelling speeds so as to achieve the same density for all test bodies.

7. The method of claim 6, comprising generating a look-up table relating said travelling speed to said line length for a desired density of said object, and interpolating between the values of said look-up table.

8. The method of claim 1, wherein said material is a powdery material.

9. The method of claim 1, wherein said material is a light-curable fluid.

10. The method of claim 1, comprising using a laser beam.

11. An apparatus for producing a three-dimensional object by scanning successive layers of a material with a beam of electromagnetic radiation along a plurality of parallel adjacent lines having different lengths to solidify the material at places corresponding to the cross-section of the object, a travelling speed of the beam along each of said adjacent lines being adjusted as a function of the length of the line, said apparatus comprising:

support means for supporting said object to be formed, coating means for applying layers of said material onto said support means or onto a previously solidified layer, beam generating means for generating a beam of electromagnetic radiation, beam directing means for directing said beam of electromagnetic radiation onto a surface of said layer for scanning said layer with a travelling speed of said beam along a plurality of adjacent lines, and control means for controlling said travelling speed of said beam as a function of the length of the line being scanned.

12. The method of claim 8, wherein said powdery material is a material selected from the group consisting of metal powder, ceramic powder, resin powder, and molding sand consisting of resin coated quartz sand.

* * * * *